United States Patent
Ronkainen (10) Patent No.: US 9,989,933 B2
(45) Date of Patent: Jun. 5, 2018

(54) CONTROLLING ACCESS TO A PROGRAM

(71) Applicant: Rovio Entertainment Ltd, Espoo (FI)

(72) Inventor: Sami Ronkainen, Espoo (FI)

(73) Assignee: ROVIO ENTERTAINMENT LTD, Espoo (FI)

( * ) Notice: Subject to any disclaimer, the term of this patent is extended or adjusted under 35 U.S.C. 154(b) by 731 days.

(21) Appl. No.: 14/174,919

(22) Filed: Feb. 7, 2014

(65) Prior Publication Data

US 2015/0227116 A1    Aug. 13, 2015

(51) Int. Cl.
*G05B 9/02*    (2006.01)
(52) U.S. Cl.
CPC .................... *G05B 9/02* (2013.01)
(58) Field of Classification Search
CPC .................................................... G05B 9/02
See application file for complete search history.

(56) References Cited

U.S. PATENT DOCUMENTS

| | | | | |
|---|---|---|---|---|
| 9,100,330 B1* | 8/2015 | Noveck | ................. | H04L 47/283 |
| 2003/0229791 A1 | 12/2003 | De Jong | | |
| 2005/0119980 A1* | 6/2005 | Kohavi | ................ | G06Q 50/188 |
| | | | | 705/80 |
| 2005/0210302 A1* | 9/2005 | Kato | .................... | G06K 7/0008 |
| | | | | 713/320 |
| 2010/0287567 A1* | 11/2010 | Hauser | ...................... | G06F 3/01 |
| | | | | 719/318 |
| 2011/0296372 A1* | 12/2011 | Bird | ....................... | G06Q 30/06 |
| | | | | 717/102 |
| 2012/0315972 A1* | 12/2012 | Olson | ..................... | A63F 13/23 |
| | | | | 463/17 |
| 2015/0193798 A1* | 7/2015 | Poreh | ................. | G06Q 30/0283 |
| | | | | 705/7.31 |

OTHER PUBLICATIONS

"C3DServer User Reference Manual", Jul. 19, 2010, http://www.motion-labs.com/pdf/C3Dserver_ug.pdf [retrieved from the Internet on Nov. 4, 2014].
Pavlina, S., "How to Permanetly Increase Your Sales 50% or More in Only One Day", Oct. 27, 2006, https://web.archive.org/web/20061027060058/http://www.dexterity.com/articles/registration-incentives.htm, [retrieved from the Internet on Nov. 4, 2014].

* cited by examiner

*Primary Examiner* — Umut Onat
(74) *Attorney, Agent, or Firm* — Squire Patton Boggs (US) LLP (57) ABSTRACT

An apparatus for controlling and granting access to computer programs, and/or industrial safety and security, is provided. The apparatus may include a memory configured to store a delay length value, at least one processing core configured to initiate delaying access to at least part of a program, to determine that at least one processing action has been performed on the apparatus by a user, and to adjust, based on the at least one processing action, the length of the delaying of access to the at least part of the program to a non-zero adjusted delay length.

28 Claims, 6 Drawing Sheets

CONTROLLING ACCESS TO A PROGRAM

FIELD OF INVENTION

The present invention relates to controlling and granting access to computer programs, and/or industrial safety and security.

BACKGROUND OF INVENTION

As computing devices have become less bulky, computing operations that used to require fixed computing equipment may increasingly be performed by mobile devices. For example, mainframe computers are no longer necessary for many tasks that may be accomplished using laptop or tablet devices. Mobile workers may prepare documents and presentations when travelling in trains, for example. Also email and calendar functions may be accomplished on the move, often facilitated by wireless communication networks.

Control of industrial processes is a field where computing is performed in fixed computers, which may be located in premises of an industrial facility. Industrial processes include, for example, power generation in coal-fired, gas-fired or nuclear power plants, different chemical processes and sequences of programmable manufacturing robots, for example such as ones to be found in a highly automated automobile manufacturing facility.

Safety of industrial processes may be affected by persons interacting with such processes. Hiring competent and reliable personnel to operate industrial processes may enable reliable and predictable management of the processes. Selecting personnel with no known criminal convictions or substance abuse problems may reduce the likelihood of an industrial accident, since operators are more likely to be present and concentrated on their tasks.

Work contracts may comprise provisions for dismissal of employees in case substance-abuse problems are identified, in accordance with local law. Similar provision may be present for cases where certain types of criminal convictions are received by employees during employment.

Where industrial processes are controlled by computers, suitable access control may be provided to prevent unauthorized access to such computers. For example, if a class of schoolchildren visits a nuclear power plant they will not be allowed to tamper with controls in a control room of the plant.

SUMMARY OF THE INVENTION

In accordance with a first aspect of the present invention, there is provided an apparatus comprising a memory configured to store a delay length value, at least one processing core configured to initiate delaying access to at least part of a program, to determine that at least one processing action has been performed on the apparatus by a user, and to adjust, based on the at least one processing action, the length of the delaying of access to the at least part of the program to a non-zero adjusted delay length.

Various embodiments of the first aspect of the present invention may comprise at least one feature from the following bulleted list:

- the at least one processing action comprises at least one of: repeatedly touching a touchscreen comprised in the apparatus, pressing a hardware key, responding to a question concerning public transportation, acknowledging an advertisement, participating in a distributed task and inputting text recognized from an image displayed on the touchscreen
- repeatedly touching the touchscreen comprises repeatedly touching images displayed on the touchscreen such that at least one of the touches satisfies at least one of a delay criterion and an accuracy criterion
- the delay criterion comprises a maximum delay between at least one of the images appearing on the touchscreen and touching it, and an accuracy criterion comprises a minimum accuracy of at least one of the touches
- the at least one processing core is further configured to cease delaying access to the at least part of the program once the length of the delay reaches at least one of the delay length value or the adjusted delay length
- the at least one processing core is further configured to cease the delaying and grant access to the at least part of the program responsive to the apparatus receiving, from a communication network, an instruction
- the at least one processing core is further configured to cease the delaying and grant access to the at least part of the program locally without receiving an instruction from a communication network
- the instruction comprises at least one of an indication that at least one of the user has made a payment and an indication that the user's reliability has been verified
- the program comprises a game
- the game comprises a free-to-play game
- the program comprises a control program of at least one of an industrial lathe, a laser cutting device and a manufacturing robot
- the apparatus comprises a mobile computing device
- the apparatus is configured to perform the storing, the initiating of delaying access, the determining that at least one processing action has been performed and the adjusting of the length of the delaying of access locally without communicating with a further node
- the at least one processing core is further configured to modify a price needed to obtain prompt access to the at least part of the program responsive to the at least one processing action
- the at least one processing core is configured to modify the price in a non-linear way in dependence on a number of processing actions determined.

In accordance with a second aspect of the present invention, there is provided a method comprising storing a delay length value, initiating delaying access to at least part of the a program, determining that at least one processing action has been performed on an apparatus by a user, and adjusting, based on the at least one processing action, the length of the delaying of access to the at least part of the program to a non-zero adjusted delay length.

Various embodiments of the second aspect of the present invention may comprise at least one feature from the preceding bulleted list.

In accordance with a third aspect of the present invention, there is provided an apparatus comprising means for storing a delay length value, means for initiating delaying access to at least part of the program, means for determining that at least one processing action has been performed on the apparatus by a user, and means for adjusting, based on the at least one processing action, the length of the delaying of access to the at least part of the program to a non-zero adjusted delay length.

In accordance with a fourth aspect of the present invention, there is provided a non-transitory computer readable medium having stored thereon a set of computer readable instructions that, when executed by at least one processor, cause at least storing a delay length value, initiating delaying access to at least part of the program, determining that at least one processing action has been performed on the apparatus by a user, and adjusting, based on the at least one processing action, the length of the delaying of access to at least part of the program to a non-zero adjusted delay length.

INDUSTRIAL APPLICABILITY

At least some embodiments of the present invention are industrially applicable in improving industrial process security by at least in part preventing unauthorized or inebriated persons from adjusting process parameters.

DETAILED DESCRIPTION OF EXAMPLE EMBODIMENTS

Figure 1:
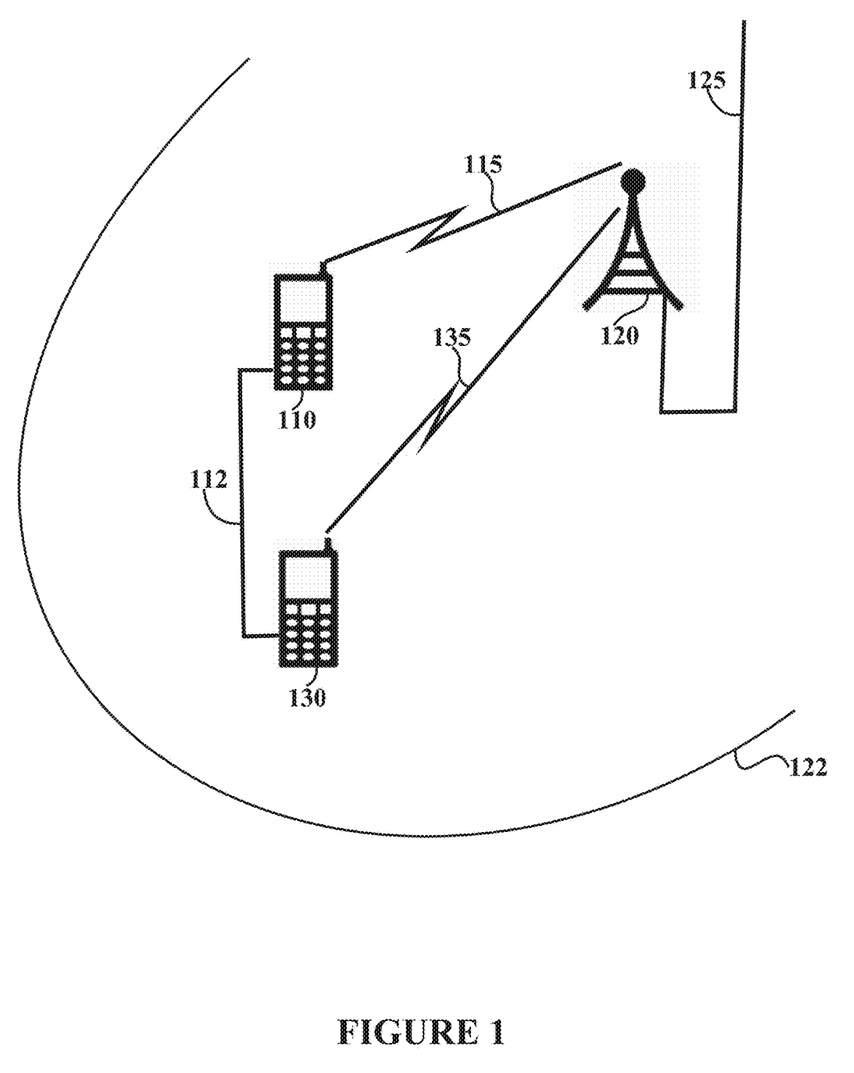
FIG. 1 illustrates a first example system capable of supporting at least some embodiments of the present invention.

FIG. 1 illustrates base station 120, which may comprise a cellular or non-cellular base station. A non-cellular base station may be referred to as an access point, for example. Base station 120 may be arranged to operate in accordance with a cellular communication standard, such as for example wideband code division multiple access, WCDMA, or long term evolution, LTE. Base station 120 may be arranged to operate in accordance with a non-cellular communication standard, such as for example wireless local area network, WLAN, also known as WiFi, or worldwide interoperability for microwave access, WiMAX. Base station 120 may be configured to establish wireless links with mobile devices in accordance with any standard or standards base station 120 is arranged to operate in accordance with.

Base station 120 is furnished with a wire-line interface 125 to further elements of the network where base station 120 is comprised. Depending on the type of network, base station 120 may be connected via wire-line interface 125 to a radio network controller, a mobility management entity, a base station controller or a gateway, for example. Base station 120 may be configured to convey information from the network, via wire-line interface 125 and wireless interfaces to mobiles attached to a cell controlled by base station 120.

Mobile 110 may comprise a cellular telephone, smartphone, tablet device, phablet device, laptop computer or other electronic device with wired or wireless communication capability. In the illustrated example, mobile 110 has wireless link 115 with base station 120. Wireless link 115 may operate in accordance with a wireless standard that both mobile 110 and base station 120 are configured to support. Wireless link 115 may comprise an uplink for conveying information from mobile 110 to base station 120. Wireless link 115 may comprise a downlink for conveying information from base station 120 to mobile 110. Wireless link 115 may be arranged to operate in accordance with time division multiple access TDMA, or code division multiple access, CDMA, principles, for example Mobile 110 may be configured to seek attachment to a cell controlled by base station 120 when disposed inside such a cell. FIG. 1 illustrates a boundary of a cell coverage area of a cell controlled by base station 120 by contour 122. As mobile 110 is disposed inside contour 122, it is within a cell coverage area of a cell controlled by base station 120 and capable of attaching to such a cell.

Responsive to approaching contour 122, mobile 110 may be configured to measure for transmissions from other base stations in anticipation of a possible handover to a cell controlled by such other base station in case mobile 110 leaves the cell coverage area defined by contour 122. Such other base stations may be comprised in the same network as base station 120, or in other networks. Such other base stations may operate in accordance with a same wireless standard as base station 120, or they may operate in accordance with a different standard. A handover to a cell controlled by a base station operating in accordance with a different standard may be referred to as an inter-radio access technology, or inter-RAT, handover.

Mobile 130 may comprise a similar device to mobile 110. Alternatively, mobile 130 may be a different device, for example where mobile 110 comprises a smartphone, mobile 130 may comprise a tablet computer. Mobile 130 is illustrated as being in communication with base station 120 via wireless link 135, which may, for example, be of a similar type to wireless link 115. Wireless links 115 and 135 may be of different communication capacities, for example if a user of mobile 110 is downloading a large file and a user of mobile 130 is engaged in a voice call, wireless link 115 may be configured with greater communication capacity, at least in the downlink, than wireless link 135.

Mobile 110 and mobile 130 are illustrated in FIG. 1 as interconnected via connection 112. Connection 112, which is an optional feature, may comprise a wireless cellular or short-range connection such as a Bluetooth or NFC, for example, connection. Alternatively, connection 112 may be a wired connection, such as for example a serial cable, for example a universal serial bus, USB, connection, or a proprietary-type wired connection. Where connection 112 is present, mobiles 110 and 130 may be configured to only use one of the wireless links 115 and 135 to base station 130. For example, mobile 130 may be configured to convey the data of mobile 110 to and from base station 120 over wireless link 135 and connection 112. Such an arrangement may be known as tethering.

Mobile 110, for example, may be directed by a user of mobile 110 to take into use a program, such as for example a computer program. The program to be taken into use may be for example an industrial process control software or an application, such as text editing application, an application for controlling finances or a game application for example. Mobile 110 may be configured to grant the user access to the program, after an initial delay. For example, mobile 110 may be configured to retrieve a reliability indicator relating to the user via wireless link 115, base station 120, connection 125 and further nodes, which further nodes are not illustrated in FIG. 1. Mobile 110 may be configured to grant access once the reliability indicator is received. Mobile 110 may be configured to grant partial access to the program at once, and fuller access, or indeed full access, after the reliability indicator is received in mobile 110. A user of mobile 110 may obtain the computer program to mobile 110 via wireless link 115, base station 120 and connection 125. The user may obtain the computer program from an online application store, for example. The program may be free of charge to install on mobile 110.

A specific type of application is a free-to-use application, wherein a user is granted limited access to the application without a payment. The payment may be monetary or non-monetary payment. An example of a free-to-use application is a free-to-play game, which may comprise an initial delay preventing the user from commencing play at once, and/or the game may comprise less than full access to, at least some of, the features of the game unless at least one instance of a payment is effected. A non-monetary payment may comprise, for example, a payment in a virtual means of exchange, such as airline frequent flier points or in-game virtual currency, which may comprise for example, virtual coins and/or virtual gold.

Mobile 110 may be configured to delay access to at least one function comprised in the program, part of the program, or the whole program, at least in part, for a duration of a delay length configured in mobile 110 and/or the program. The at least one function may be comprised in a program, thus delaying access to at least part of a program may comprise delaying access to at least one function. In other words, mobile 110 may be configured to delay access for a time period that is at most the same length as the configured delay length. The configured delay length may be 12 or 24 hours, for example. In case a reliability indicator of the user is received before the length of the delay reaches the configured delay length, the delaying may be interrupted and access granted right away, or sooner than was originally configured in that the delay length may be modified to a non-zero adjusted delay length smaller than the original, configured delay length.

In some embodiments, the delaying is used without a reliability indicator. In some of these embodiments, in case the program comprises industrial process control software, a stolen mobile 110 may be remotely deactivated, or access to the program via mobile 110 may be terminated. The delay may thus prevent a malicious or incompetent user from modifying the industrial process before mobile 110 or its access is terminated remotely. In some embodiments where a reliability indicator is not used, a payment or processing action or a combination of both may be employed, wherein the delaying may be shortened in duration, or interrupted to grant immediate access, directly or indirectly responsive to a payment or processing action or a combination of both.

The user may be able to affect the length of the delay by causing mobile 110 to perform a processing action, which may involve the user interacting with mobile 110. For example to demonstrate she is not inebriated, the user may be tested by mobile 110, wherein mobile 110 may display small images on a touchscreen of mobile 110. The images may be small images of flowers, such as daffodils, for example. The user should then try to quickly and accurately touch each image as it emerges on the display, and mobile 110 can determine by comparing the user's performance to a preconfigured benchmark, if the user is reacting quickly enough and/or accurately enough to be considered sober. In case the user reacts quickly and/or accurately enough, the delay time may be adjusted, for example by shortening it, for example by reducing it to half. Reduction to half may comprise that once the length of the delay reaches one half of the configured delay length, mobile 110 ceases the delaying and grants partial or complete access to the program. In case the length of the delay already exceeds half of the configured delay length when the reduction occurs, mobile 110 may simply grant access when the reduction occurs. Alternatively, the user may simply repeatedly tap the touchscreen to affect the length of the delay. Mobile 110 may measure how accurately the user in this case maintains the same rhythm to determine sobriety of the user, or indeed lack of sobriety.

The user interaction to affect the length of the delay may be beneficial to a party. For example, the user may be queried on punctuality or use of public transportation, which can be used as feedback provided to a public utility in charge of running public transportation, for example to a site of the industrial process the program relates to. A coherent and/or knowledgeable answer may act as validation of the user's ability to function.

The user interaction may comprise acknowledging an advertisement. For example, mobile 110 may display a visual or audio-visual advertisement, which the user acknowledges, for example by tapping an onscreen icon that appears in connection with the advertisement. When acknowledging a plurality of advertisements, the icon used for acknowledgement may appear in a different part of the screen for subsequent advertisements, requiring some mental effort for the user to locate the icon before tapping it. Advertisements may be audio advertisements played to the user via a loudspeaker comprised in mobile 110. A party that has produced or provided the program may receive income from advertisements acknowledged by the user along a similar line as revenue generated when users click online advertisements on the World Wide Web. Such income may originate from the advertiser or his representative, for example.

Advertisements may be selected at least in part based on at least one of a user profile and a location of mobile 110, or the user in general. For example, if the user uses a desktop computer, a history of Internet searches may be used to at least in part choose which advertisements to show.

Acknowledging advertisements may be made more engaging by asking a question concerning the contents of an advertisement after the advertisement has been displayed, or played. Mobile 110 may be configured to respond to a correct answer by adjusting, such as shortening, the length of the delay. For example, the user may be asked how many percent were goods marked down in the store that was the subject of the most recently displayed, or played, advertisement. When the user mentally processes information in advertisements, such as is necessary to reply to questions concerning the contents of the advertisements, their impact on his or her behaviour is likely to be greater. A correct answer may result in shortening the length of the delay, while an incorrect one may result in no effect, or a smaller effect, on the delay.

The user interaction may comprise inputting text in a text input program or interface, the text being recognized by the user from an image displayed on the screen. The image may display text in a modified way, such as smudged, stretched or at least in part out of focus, requiring some mental effort to recognize the lettering. Such mental effort, when performed correctly, may be used as an indicator of user reliability and/or sobriety. In addition to verifying the ability of the user to function, such human text recognition may be usable in adjusting the functioning of machine-based textual recognition programs. This may in turn provide income to the party that has produced or provided the program, the income deriving from providers of textual-recognition software.

In some embodiments, the delay is interruptible by a payment conducted by the user. The user may be informed of a payment amount for interrupting the delay, responsive to which the user may choose to conduct the payment, which may be, for example, 3.00 euros. Responsive to mobile 110 receiving a notification that the payment is complete, it may decrease the delay or alternatively cease the delaying and provide access to the program to the user. A payment, for example by credit card, may be arranged to provide a reliable indication of the identity of the user, which may remove the need for the delay. In some embodiments, payment itself isn't needed in case a reliably binding indication of payment from the user to pay is obtained. An example of such an indication is agreement from the user to add the required sum to his monthly phone or other utility bill.

A user interaction, such as for example those described above, may be usable not only to adjust a length of the delay, but also to adjust the payment needed to interrupt the delay to get prompt access to the program. A first number of user interactions may serve to reduce the length of the delay by a first percentage and to reduce the payment by a second percentage. The first percentage may be different from the second percentage, or they may be the same. For example, performing a user interaction twenty times may reduce the delay by 10% and the payment by 15%. For example, performing a user interaction a hundred times may reduce the delay by 25% and the payment by 20%. A first function may be defined specifying a relationship between a number or repetitions of a user interaction and the reduction of the delay. A second function may be defined specifying a relationship between a number or repetitions of a user interaction and the reduction of the payment. The first and second functions may be the same function, or different functions. In general at least one of the first and second functions may be non-linear, in other words doubling the number of user interactions may not double the reduction in delay and/or payment.

Overall, where a user interaction is usable to reduce the payment needed to interrupt the delaying and obtain prompt access to the program, the producer or provider of the program may obtain compensation for the reduction in the payment. For example, where the user interaction comprises acknowledging advertisements and an advertiser pays for each acknowledged advertisement, the payments from the advertiser, or advertisers, can in part or in whole make up for the reduction in the payment. Similar considerations may apply where the producer or provider of the program receives payments from a text recognition software provider.

In some embodiments the user interaction may comprise repeatedly tapping a screen or push-button, for example, to cause a character in a game to, for example, dig a hole in the ground. In such an example use case, having a hole in the ground may be essential part of the plot-line of the game. To dig the hole in the game, the user may have a choice of conducting a payment or to wait, for example, six hours. In addition to those choices, the user may have an option of reducing the payment and reducing the waiting time, which in this example embodiment, is the six hours mentioned above, by, for example, simulating, in the game, manually digging the hole. The simulation could be achieved for example by consecutive taps made by the user. The number of taps may progressively reduce the payment needed to interrupt the delaying and/or the remaining non-zero adjusted delay length. This may provide the benefit that the user may thus be enabled to modify the delaying behaviour of the game by interacting with it, which may yield an experience of empowerment to the user. In some example embodiments, the user may be enabled to bargain a payment by utilizing user interaction(s) in a similar manner as described above.

In addition to or alternatively to a user interaction, mobile 110 may be able to perform as the processing action a mathematical task, such as for example participate in a distributed processing event, to affect the length of the delay and/or the price. An example of a distributed processing event is a processing action to determine a three-dimensional structure of a protein molecule. Another example is a distributed search for a decryption key that has been lost.

Figure 2:
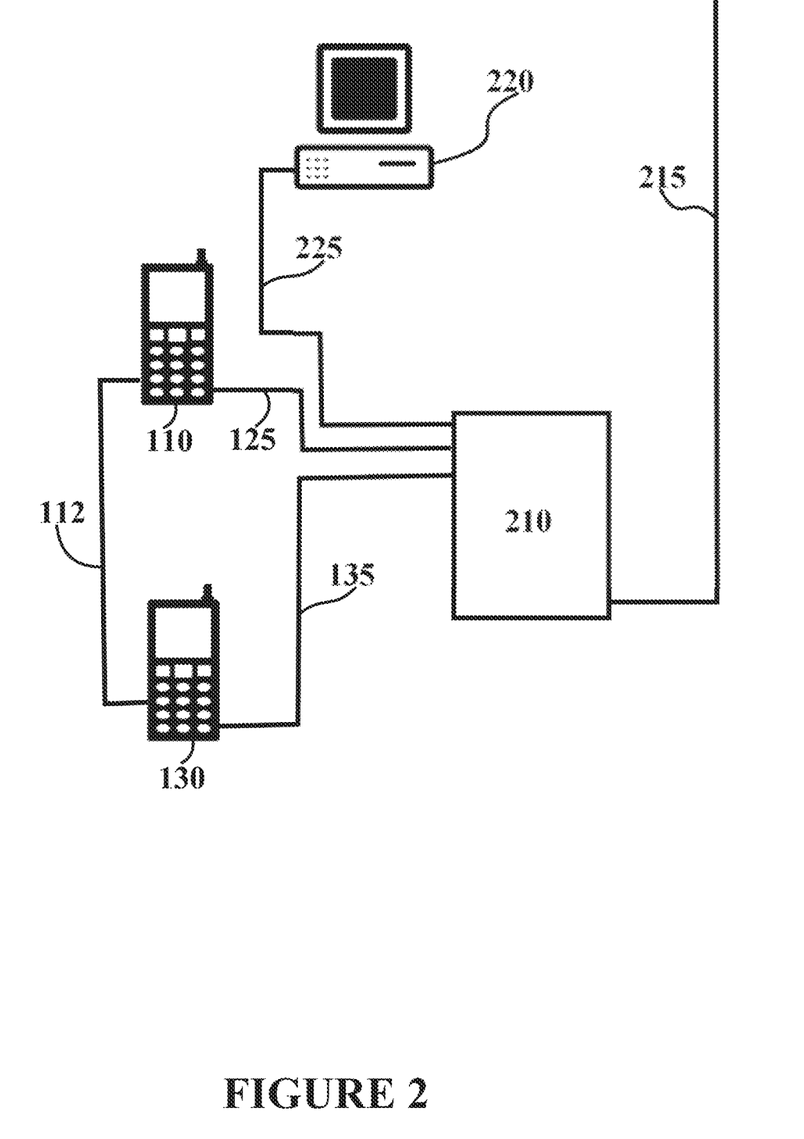
FIG. 2 illustrates a second example system capable of supporting at least some embodiments of the present invention.

FIG. 2 illustrates a second example system capable of supporting at least some embodiments of the present invention. In FIG. 2, mobile 110, mobile 130 and connection 112 may be substantially similar to those elements in FIG. 1. FIG. 2 illustrates also gateway 210, which may comprise, for example, a home digital subscriber line gateway. Mobile 110, mobile 130 and/or computer 220 may be connected to gateway 210 via connections 125, 135 and 225, respectively. Connections 125, 135 and 225 may comprise wire-line connections such as Ethernet cables, for example, or they may be at least in part wireless connections, such as WiFi connections. At least one of connections 125, 135 and 225 may be at least in part wireless and at least one of them may be wire-line. Gateway 210 may be on communication with a further network via connection 215, which may be a wire-line connection, for example. Gateway 210 may be configured to provide to devices connected thereto connectivity to a further network, which may be an operator network or the Internet, for example.

A user of computer 220, mobile 110 or mobile 130 may obtain a program, such as for example an industrial process control program or a game. The program may be configured to cause the computer 220, mobile 110 or mobile 130 to delay access to the program to prevent a user from immediately starting to use the program. For example, a user of computer 220 may obtain the program free of charge from an online application store via connection 225, gateway, connection 215 and further connections, which are not illustrated in FIG. 2.

Figure 3:
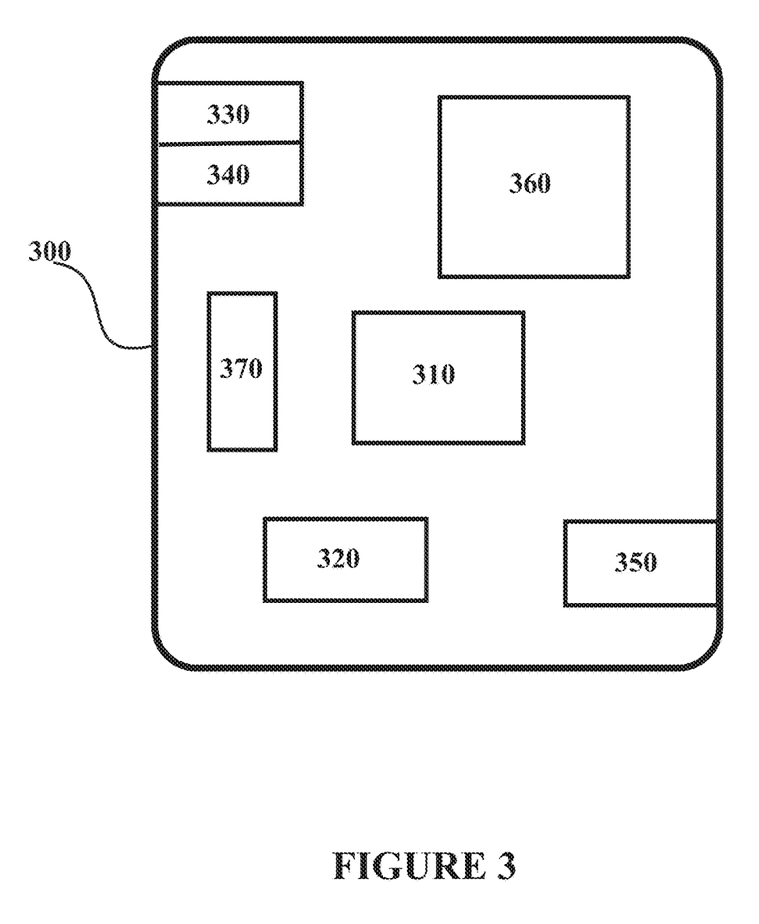
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as mobile 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a QUALCOMM SNAPDRAGON 800 processor, for example. Processor 310 may comprise more than one processor. A processing core may comprise, for example, a CORTEX-A8 processing core manufactured by INTEL CORPORATION or a BRISBANE processing core produced by ADVANCED MICRO DEVICES CORPORATION. Processor 310 may comprise at least one application-specific integrated circuit, ASIC. Processor 310 may comprise at least one field-programmable gate array, FPGA.

Device 300 may comprise memory 320. Memory 320 may comprise random-access memory and/or permanent memory. Memory 320 may comprise at least one RAM chip. Memory 320 may comprise magnetic, optical and/or holographic memory. Memory 320 may be at least in part accessible to processor 310. Memory 320 may comprise computer instructions that processor 310 is configured to execute.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
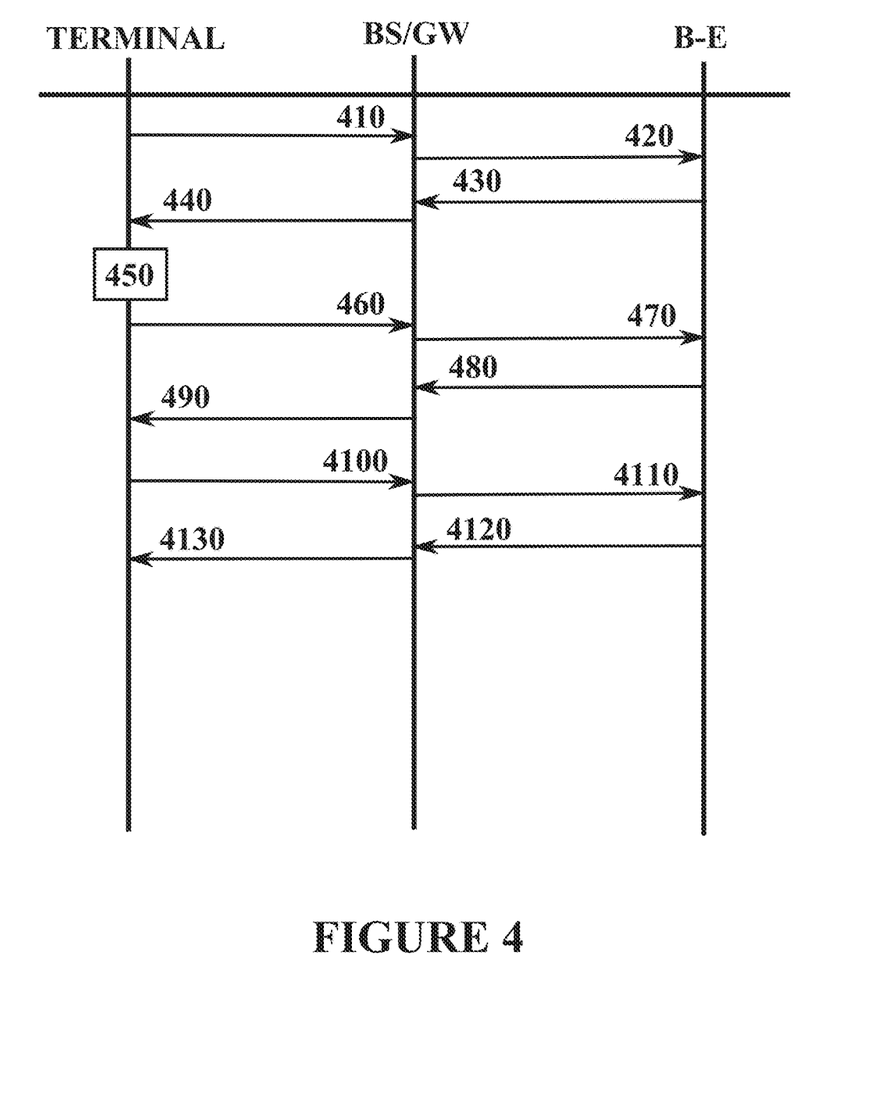
FIG. 4 is a signalling diagram illustrating signalling in accordance with at least some embodiments of the present invention.

FIG. 4 is a signalling diagram illustrating signalling in accordance with at least some embodiments of the present invention. On the vertical axes are, from left to right, a terminal, such as for example mobile 110 or mobile 130 of FIG. 1, or computer 220 of FIG. 2. The middle vertical axis corresponds to a gateway, which may correspond to base station 120 of FIG. 1 or gateway 210 of FIG. 2, for example. Finally, on the right-hand-side vertical axis is disposed a backend, which may comprise one node, a plurality of nodes or a plurality of functions on one or more nodes, the nodes being disposed at disparate locations, for example.

In phase 410 the terminal may request for a program to be furnished to the terminal. The gateway in phase 420 forwards the request of phase 410 to the backend, which may comprise, for example, an application store where the program is available.

In phase 430 and 440, the backend responsively provides the program to the terminal, via the gateway. The program may be configured to cause the terminal to delay access to itself for a configured delay length of time. The length of the delay may be adjustable based on at least one processing action, such as a user interaction with the program. Examples of suitable processings have been provided above.

In phase 450, the terminal may perform a single processing action, or a plurality of processing actions with the program. As described above, the processing action or actions may involve user interactions with the terminal.

In phases 460 and 470, the terminal informs, via the gateway, the backend of the processing action or processing actions of phase 450. Responsively, in phases 480 and 490 the backend may inform or confirm to the terminal that the length of the delay and/or the price necessary to interrupt the delay have been adjusted. The message of phase 490 may comprise an indication of the magnitude(s) of the adjustment (s) and/or the adjusted length of the delay and/or the adjusted price. An adjusted length of the delay may comprise an adjusted total length and/or a remaining length of the delay after the adjustment has been taken into account.

In phase 4100, the terminal may indicate a payment of the adjusted price, or a willingness to pay the adjusted price. In phase 4110, the gateway may forward at least part of the information comprised in the message of phase 4100 to the backend. In some embodiments, the backend waits for a confirmation that the payment has been made before authorizing interruption of the delay and prompt access to the program. In other embodiments the backend trusts the user's credit and authorizes interruption of the delay and prompt access to the program based on the indication of willingness to pay.

In phases 4120 and 4130, the backend authorizes interruption of the delay and prompt access to the program by signalling to such effect to the terminal, via the gateway.

Figure 5:
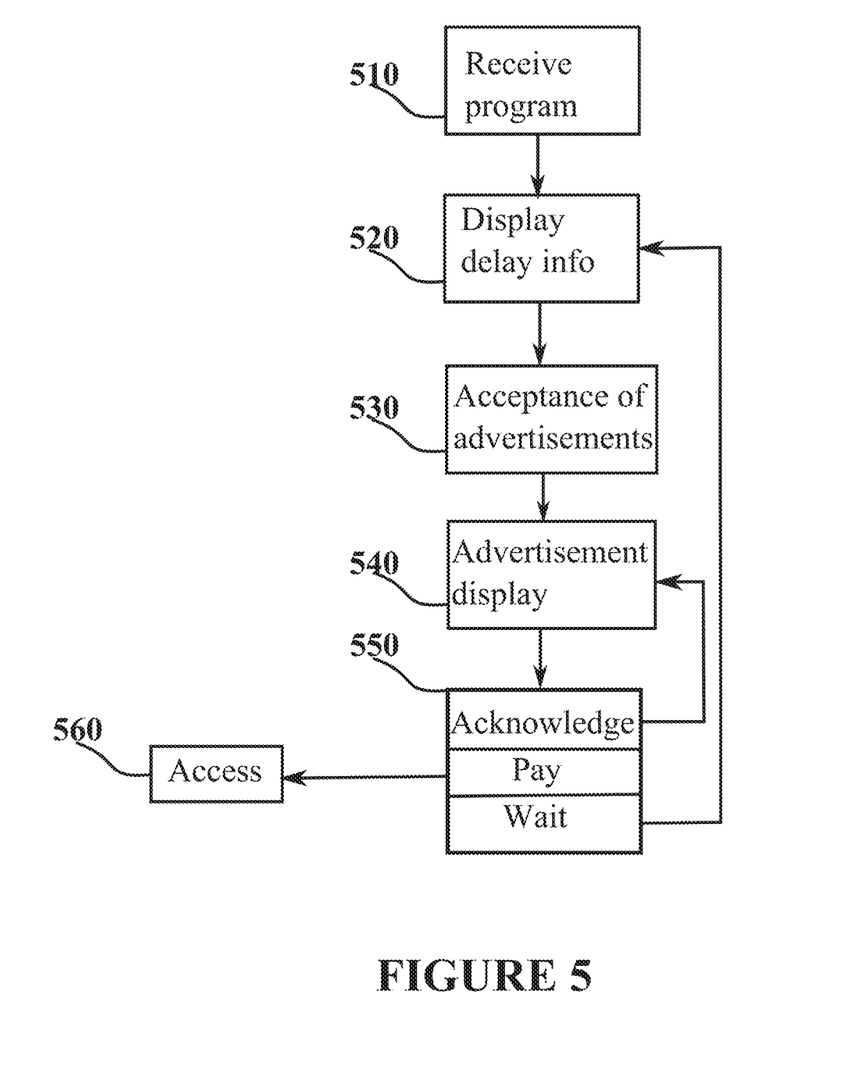
FIG. 5 is a first flowchart, illustrating an example method according to an embodiment of the present invention.

FIG. 5 is a first flowchart, illustrating an example method according to an embodiment of the present invention. The phases of the illustrated method may be performed in mobile 110 or computer 210, for example. In phase 510 a program, such as for example a process control program, process control interface program, or game, is received.

In phase 520, a user is informed of a delay before access to the program is granted to the user. The delay may be indicated as 24 hours, for example. Optionally, the user may be informed of a payment which unlocks prompt access to the program. In other words, a payment may be used to circumvent the delay. In phase 520, the user may be informed of ways to adjust the length of the delay, and in case a payment is displayed, optionally also of ways to adjust the payment. For example, the user may be informed that he or she may choose to observe advertisements to shorten the length of the delay and/or to reduce the payment needed to gain prompt access to the program.

In the example of FIG. 5, the user chooses to observe, by viewing and/or listening, advertisements to shorten the length of the delay and/or to reduce the payment needed to gain prompt access to the program. The user indicates this choice in phase 530.

In phase 540, an advertisement is displayed or otherwise presented to the user, for example by displaying it on a screen or playing it through a loudspeaker. The advertisement may be selected based at least in part on a profile or location of the user.

Phase 550, which may follow phase 540, presents the user with three options. The first option is to acknowledge the advertisement, in which case the user may use a user interface function, such as clicking or touching an icon, to indicate acknowledgement of the advertisement. Responsive to the use of the user interface function to acknowledge the advertisement, the user may optionally be prompted to answer a question relating to the contents of the advertisement. A correct answer may result in shortening the length of the delay and/or to reducing the payment, while an incorrect one may result in no effect, or a smaller effect, on the delay and/or payment. From acknowledgement, processing proceeds back to phase 540 where an advertisement, for example a different advertisement than the one displayed previously, is presented to the user.

The second option in phase 550 is payment. The user may in phase 550 be presented with an adjusted payment that is needed to interrupt the delay and gain prompt access to the program. Responsive the user selecting the payment option, a payment processing may occur, for example with a credit card processor or a cellular operator, after which processing may advance to phase 560, where access to the program is granted.

The third option in phase 550 is to resume waiting for the delay to expire. In case at least one advertisement has been acknowledged, the delay time may be reduced compared to the initial delay length displayed initially in phase 520. Responsive to the user selecting the waiting option in phase 550, processing may return to phase 520.

Phase 550 may occur at least in part simultaneously with phase 540. For example, an advertisement video clip may be displayed on-screen, and at the end of the clip a menu of the three options of phase 550 may be displayed so that the last frame of the advertisement video clip is at least in part visible as background.

Figure 6:
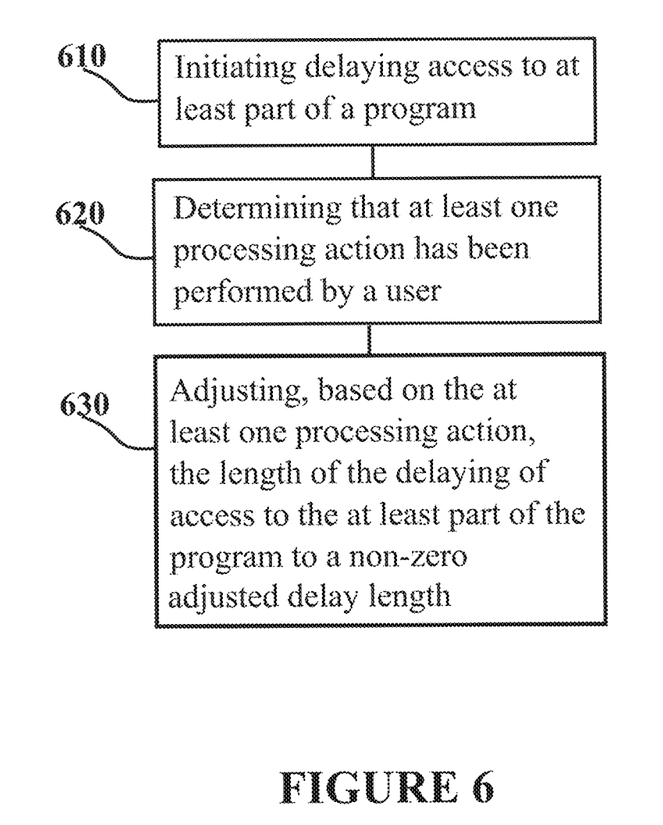
FIG. 6 is a second flowchart, illustrating an example method according to at least some embodiments of the present invention.

FIG. 6 is a second flowchart, illustrating an example method according to at least some embodiments of the present invention. The phases of the illustrated method may be performed in mobile 110 or computer 210, for example.

Phase 610 comprises initiating delaying access to at least part of the program. Phase 620 comprises determining that at least one processing action has been performed on the apparatus by a user, and finally phase 630 comprises adjusting, based on the at least one processing action, the length of the delaying of access to the at least part of the program to a non-zero adjusted delay length.

In general there is provided an apparatus comprising a memory configured to store a delay length value, and at least one processing core configured to initiate delaying access to a program, to determine that at least one processing action has been performed on the apparatus by a user, and to adjust, based on the at least one processing action, the length of the delaying of access to the program to a non-zero adjusted delay length. Adjusting to a non-zero adjusted delay length may comprise modifying the length of the delay to a value that lies between zero and the original, unadjusted, delay length value. The at least one processing action may comprise a user interaction. The at least one processing action may comprise participation in a distributed mathematical task.

Adjusting the length of the delay may comprise adjusting the overall length of the delay, from commencement of the delay to expiry of a delay period. Adjusting the length of the delay may therefore go beyond simply adjusting the length of remaining delay.

A processing action comprising a user interaction may comprise at least one of: repeatedly touching a touchscreen comprised in the apparatus, responding to a question concerning public transportation, acknowledging an advertisement and inputting text recognized from an image displayed on the touchscreen.

Repeatedly touching the touchscreen may comprise repeatedly touching images displayed on the touchscreen such that at least one of the touches satisfies at least one of a delay criterion and an accuracy criterion. A delay criterion may be defined as a threshold for a maximum or average time elapsed between starting to display an individual image and a corresponding touch interaction. An accuracy criterion may be defined as a threshold for a maximum or average distance from a centre-point of a displayed image to a centre-point of a corresponding touch interaction, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   at least one processor; and
   at least one memory including computer program code, the computer program code comprising at least one part associated with a price for prompt access to the part of the program,
   wherein the at least one memory and the computer program code are configured to, with the at least one processor, cause the apparatus to at least:
   store a delay length value for accessing the at least one part of the program and the price for prompt access to the at least one part of the program;
   initiate delaying access to the at least one part of the program;
   determine that at least one processing action has been performed on the apparatus by a user; and
   adjust, based on the at least one processing action, the length of the delaying of access to the at least one part of the program to a non-zero adjusted delay length and the price for prompt access to the at least one part of the program,
   wherein a first number of processing actions performed on the apparatus by the user reduces the delay length value by a delay reduction percentage value and the price for prompt access by a price reduction percentage value.

2. The apparatus according to claim 1, wherein the at least one processing action comprises at least one of: repeatedly touching a touchscreen comprised in the apparatus, pressing a hardware key, responding to a question concerning public transportation, acknowledging an advertisement, participating in a distributed task and inputting text recognized from an image displayed on the touchscreen.

3. The apparatus according to claim 2, wherein repeatedly touching the touchscreen comprises repeatedly touching images displayed on the touchscreen such that at least one of the touches satisfies at least one of a delay criterion and an accuracy criterion.

4. The apparatus according to claim 3, wherein the delay criterion comprises a maximum delay between at least one of the images appearing on the touchscreen and touching it, and an accuracy criterion comprises a minimum accuracy of at least one of the touches.

5. The apparatus according to claim 1, wherein the at least one memory and the computer program code are further configured to, with the at least one processor, cause the apparatus to at least cease delaying access to the at least one part of the program once the length of the delay reaches at least one of the delay length value or the adjusted delay length.

6. The apparatus according to claim 5, wherein the at least one memory and the computer program code are further configured to, with the at least one processor, cause the apparatus to at least cease the delaying and grant access to the at least one part of the program responsive to the apparatus receiving, from a communication network, an instruction.

7. The apparatus according to claim 6, wherein the instruction comprises at least one of an indication that at least one of the users have made a payment and an indication that the user's reliability has been verified.

8. The apparatus according to claim 1, wherein the program comprises a game.

9. The apparatus according to claim 8, wherein the game comprises a free-to-play game.

10. The apparatus according claim 1, wherein the program comprises a control program of at least one of an industrial lathe, a laser cutting device and a manufacturing robot.

11. The apparatus according to claim 1, wherein the apparatus comprises a mobile computing device.

12. The apparatus according to claim 1, wherein the at least one memory and the computer program code are further configured to, with the at least one processor, cause the apparatus to at least perform the storing, the initiating of delaying access, the determining that at least one processing action has been performed and the adjusting of the length of the delaying of access locally without communicating with a further node.

13. The apparatus according to claim 1, wherein the at least one memory and the computer program code are further configured to, with the at least one processor, cause the apparatus to at least modify a price needed to obtain prompt access to the at least one part of the program responsive to the at least one processing action.

14. The apparatus according to claim 13, wherein the at least one memory and the computer program code are further configured to, with the at least one processor, cause the apparatus to at least modify the price in a non-linear way in dependence on a number of processing actions determined.

15. A method, comprising:
   storing, by a memory comprised in an apparatus, a computer program code comprising at least one part associated with a price for prompt access to the part of the program;
   storing, by the memory comprised in the apparatus, a delay length value for accessing the at least one part of the program and the price for prompt access to the at least one part of the program;
   initiating, by at least one processing core, delaying access to at least one part of the program;
   determining that at least one processing action has been performed on the apparatus by a user; and
   adjusting, based on the at least one processing action, the length of the delaying of access to the at least one part of the program to a non-zero adjusted delay length and the price for prompt access to the at least one part of the program, wherein a first number of processing actions performed on the apparatus by the user reduces the delay length value by a delay reduction percentage value and price for prompt access by a price reduction percentage value.

16. The method according to claim 15, wherein the at least one processing action comprises at least one of: repeatedly touching a touchscreen comprised in the apparatus, pressing a hardware key, responding to a question concerning public transportation, acknowledging an advertisement, participating in a distributed task and inputting text recognized from an image displayed on the touchscreen.

17. The method according to claim 16, wherein repeatedly touching the touchscreen comprises repeatedly touching images displayed on the touchscreen such that at least one of the touches satisfies at least one of a delay criterion and an accuracy criterion.

18. The method according to claim 17, wherein the delay criterion comprises a maximum delay between at least one of the images appearing on the touchscreen and touching it, and an accuracy criterion comprises a minimum accuracy of at least one of the touches.

19. The method according to claim 15, further comprising ceasing delaying access to the at least part of the program once the length of the delay reaches at least one of the delay length value or the adjusted delay length.

20. The method according to claim 19, further comprising ceasing the delaying and granting access to the at least part of the program responsive to the receiving, from a communication network, an instruction.

21. The method according to claim 20, wherein the instruction comprises at least one of an indication that at least one of the users have made a payment and an indication that the user's reliability has been verified.

22. The method according to claim 15, wherein the program comprises a game.

23. The method according to claim 22, wherein the game comprises a free-to-play game.

24. The method according to claim 15, wherein the storing, the initiating of delaying access, the determining that at least one processing action has been performed and the adjusting of the length of the delaying of access are performed locally in the apparatus without communicating with a further node.

25. The method according to claim 15, further comprising modifying a price needed to obtain prompt access to the at least part of the program responsive to the at least one processing action.

26. The method according to claim 25, comprising modifying the price in a non-linear way in dependence on a number of processing actions determined.

27. An apparatus comprising:

means for storing a computer program code comprising at least one part associated with a price for prompt access to the part of the program;

means for storing a delay length value for accessing the at least one part of the program and the price for prompt access to the at least one part of the program;

means for initiating delaying access to at least one part of the program;

means for determining that at least one processing action has been performed on the apparatus by a user; and means for adjusting, based on the at least one processing action, the length of the delaying of access to the at least one part of the program to a non-zero adjusted delay length and the price for prompt access to the at least one part of the program, wherein a first number of processing actions performed on the apparatus by the user reduces the delay length value by a delay reduction percentage value and price for prompt access by a price reduction percentage value.

28. A non-transitory computer readable medium having stored thereon a set of computer readable instructions that, when executed by at least one processor, cause at least:

storing a computer program code comprising at least one part associated with a price for prompt access to the part of the program;

storing a delay length value for accessing the at least one part of the program and the price for prompt access to the at least one part of the program;

initiating delaying access to at least one part of the program;

determining that at least one processing action has been performed on an apparatus by a user; and adjusting, based on the at least one processing action, the length of the delaying of access to at least one part of the program to a non-zero adjusted delay length and the price for prompt access to the at least one part of the program, wherein a first number of processing actions performed on the apparatus by the user reduces the delay length value by a delay reduction percentage value and price for prompt access by a price reduction percentage value.

* * * * *